Nov. 23, 1965   F. RAUFENBARTH ETAL   3,219,937
BOOTSTRAP-INTEGRATOR
Filed May 22, 1964   2 Sheets-Sheet 1

INVENTORS:
Franz Raufenbarth
Manfred Käfer
BY Darby, Robertson & Vandenburgh
Attys

United States Patent Office 3,219,937
Patented Nov. 23, 1965

3,219,937
BOOTSTRAP-INTEGRATOR
Franz Raufenbarth, Schonaich, near Stuttgart, and Manfred Kafer, St. Georgen, Black Forest, Germany, assignors to W. H. Joens & Co. G.m.b.H., Dusseldorf, Germany
Filed May 22, 1964, Ser. No. 369,633
Claims priority, application Germany, May 24, 1963,
J 23,759
13 Claims. (Cl. 328—127)

Frequently, it is desired to take the time integral of an electrical measuring value. Examples are electric analog computers for the solution of linear differential equations, which are assembled by suitably combining several integrators, and gyroscope systems wherein various signals may be integrated.

Various electric integrating circuits are known. In one such circuit an electrical signal to be integrated is converted to a pulse signal having a frequency proportional to the magnitude of the electrical signal and the pulses are counted. This, however, only provides a digital indication and does not provide an analog output voltage proportional to the integral, as is frequently required, which voltage may be utilized for further computing or controlling operations.

The most simple form of an electric integrating device comprises a capacitor being charged by a measuring voltage via a resistor. With such an arrangement the voltage across the capacitor is substantially equivalent to the time integral of the measuring voltage as long as the measuring voltage is great with respect to the capacitor voltage and the time average thereof, respectively. Under this condition it may be assumed that the charging current $i$ is proportional to the measuring voltage $u_e$, viz.

$$i = \frac{u_e}{R}$$

if R is the charging resistor. Under this condition the capacitor voltage $u_a$ becomes $$u_a = \frac{1}{C}\int i\,dt = \frac{1}{RC}\int u_e\,dt$$

The condition $u_a < u_e$ may still be fulfilled approximately by using large values of R and C, unless the operations to deal with are very slow. In such a case, R and C would have to become so great that leakage currents of the capacitor become comparatively large with respect to the small charging current. In addition, the output voltage $u_a$ would decrease so much as to require direct current amplification thereof. Therefore, the integration by means of a simple RC circuit is impossible in many cases, particularly in the case of slow running operations and longer integration periods.

Further, an integrator is known wherein the output of an amplifier with high gain is fed back in counter-coupling sense to the input thereof by way of a capacitor. It may be shown then, that the output voltage of the amplifier corresponds to the time integral of the input voltage. Strictly speaking, however, this would only apply to an amplifier with infinitely high gain. The necessity of designing an amplifier with high gain involves undesirably great expense. The impossibility of making the gain infinite results in the fact that with this type of integrator, called a Miller integrator, an accurate integration can usually not be accomplished.

Another type of integrator is known wherein a capacitor is charged by the voltage to be integrated via a charging resistor. With these integrators the capacitor voltage is amplified, and by positive feedback from the output of the amplifier means the input voltage is increased respectively by the amount of the capacitor voltage. This integrator is based on the following conception:

With a simple RC-circuit the charging current $i$ by which the capacitor is being charged via the charging resistor R, is initially, with the capacitor uncharged, proportional to the input voltage $u_e$ assumed here to be constant, so that $$i = \frac{u_e}{R}$$

and the output voltage $$u_a = \frac{i}{C}\int i\,dt$$

being proportional to the integral of the input voltage. Finally, however, there will come a moment where the output voltage $u_a$ across the capacitor cannot be neglected any longer. With a constant input voltage the charging current $$i = \frac{u_e - u_a}{R}$$

will asymptotically approach zero. To avoid this, the capacitor voltage $u_a$ is applied to the input of an amplifier and the amplifier feeds a voltage being exactly equal to $u_a$ into the charging circuit. With increase of the counter voltage across the capacitor the charging voltage is thus always increased by the same amount so that the capacitor is always charged with the full input voltage $u_e$ via the charging resistor. The voltage across the charging resistor is $(u_e + u_a) - u_a$, and the charging current $i$ of the capacitor is always $$i = \frac{u_e}{R}$$

independently of the fact up to what voltage the capacitor has already been charged. Such integrators are called "bootstrap-integrators."

With these integrators it is of importance to feed the output voltage of the amplifier with respect to the amount with a gain of one into the charging circuit. The quality of the integrator is dependent on how accurately the gain of one may be attained and be maintained within the control range of the amplifier. A bootstrap-integrator is known wherein the amplifier is fashioned as two-stage amplifier, the two stages comprising valves as normal anode amplifiers, having gains $V_1$, $V_2$ different from one. The output of the amplifier is applied to a voltage divider comprised of two resistors $R_k$ and $\rho$, of which the resistor $\rho$ having a voltage drop thereacross $$u_\rho = -u_a \cdot V_1 V_2 \frac{\rho}{R_k + \rho}$$

is connected into the charging circuit of the capacitor. Through adequate selection of the partial voltage ratio $$\frac{\rho}{R_k + \rho}$$

the factor may be made $$V_1 V_2 \frac{\rho}{R_k + \rho} = 1$$

With such an integrator an accurate integration may actually be carried out. However, the gain of the amplifier $V_1 \cdot V_2$ enters into the aforementioned factor. Thus, changes in this gain such as caused by line voltage variations, or by valve aging, directly influence the accuracy of the integration (compare "Elektronische Rundschau" No. 3, 1957, pages 73 and 74).

It is further known with a bootstrap-integrator to have the amplifier fashioned as a cathode amplifier. As is well known, cathode amplifiers have a gain which is always approximately one and may not markedly change by valve aging (compare "Regelungstechnik" No. 7 (7. Jahrgang 1959) pages 234–239). This, however, involves the disadvantage that the gain although always approximately one must, however, always be somewhat smaller than one. Between input and output voltages, i.e. here between grid and cathode of the amplifier valve, there must always still exist a voltage difference so that the valve may be controlled. This impossibility of accurately obtaining a gain of one with a cathode amplifier leads to the same type of systematic error with this type of bootstrap-integrator as prevails with the Miller integrator hereinbefore described due to the impossibility of obtaining an infinitely great gain.

It is the object of this invention to avoid the disadvantages as described of the known arrangements.

According to the invention this object is attained with a bootstrap-integrator with multi-stage amplifier means by providing that the valve amplifier is fashioned as a cathode amplifier and controls a transistor in base connection and that the transistor feeds a current through a positive feedback resistor connected into the charging circuit of the capacitor.

Thus, the cathode resistor is not connected alone into the charging circuit of the capacitor, as is the case with the one-stage amplifier arrangement described which leads to systematic errors due to the gain of 1, but the cathode amplifier controls a transistor feeding a current through a resistor in the charging circuit. This transistor operates in base connection. A base connection of a transistor is characterized by a constant current amplification which (similar to the voltage amplification with the cathode amplifier) is always somewhat less than one (from 0.95 to 0.99). This gain is influenced only to a very small extent by interfering influences and change of the load resistor. By proportioning the resistor connected into the load circuit, through which the collector current of the transistor flows, the voltage drop thereacross—or across the resistor plus across the cathode resistor of the valve amplifier—may be made to be always exactly oppositely equal to the capacitor voltage $u_a$, a ratio of exactly one being obtainable. On the other hand, by using a cathode amplifier in combination with a transistor in base connection both of which result in gains of approximately one, rather independently of other influences, a most substantial stability of the circuit arrangement is obtained. In this respect, the arrangement of the invention is substantially distinguished from the known arrangement hereinbefore described with a two-stage anode amplifier where there is the danger of an error by a change in the gain $V_1 . V_2$. The cathode amplifier fashioned as valve amplifier provides for a negligible load of the integration capacitor while the transistor with constant current amplification makes it possible to ensure by proportioning of the positive feedback resistor that the positive feedback voltage supplied is always exactly equal to the capacitor voltage.

Several embodiments of the invention are presented in the drawings and described as follows.

Figure 3:
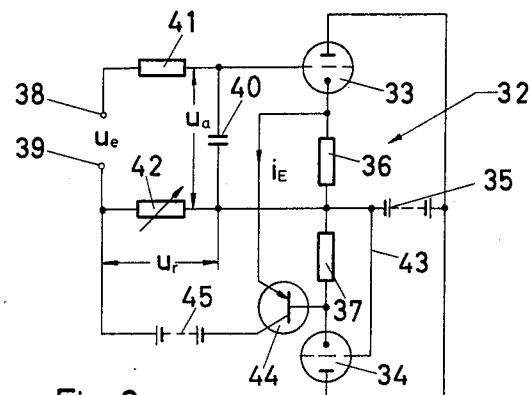
Figure 4:
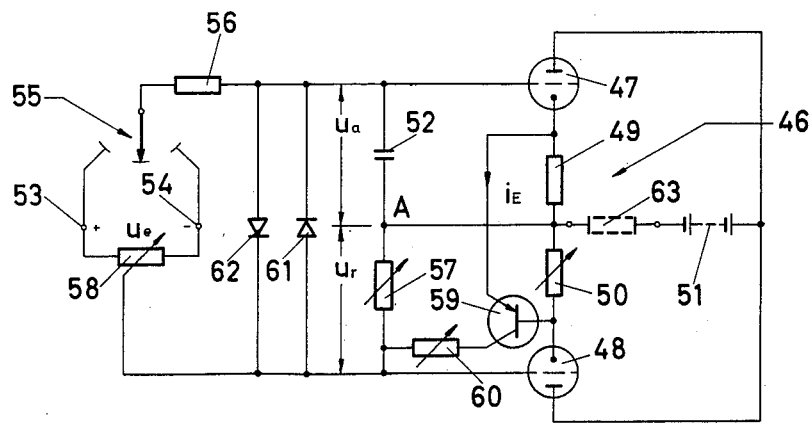

FIG. 3 illustrates an arrangement with a differential amplifier whereby the influence of the cathode currents also flowing with the capacitor voltage $u_a = 0$, is eliminated; and FIG. 4 illustrates a further modification of the arrangement in FIG. 3, wherein both triodes of the differential amplifier are controlled, one by the capacitor voltage and the other by the positive feedback voltage so as to effect substantial compensation of the influences of the curvature of characteristic.

Figure 1:
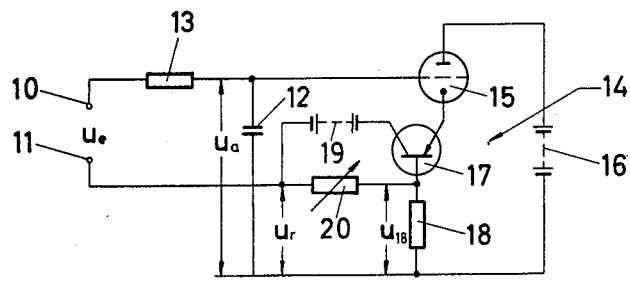
FIG. 1 illustrates the simplest embodied form of a bootstrap-integrator.

In FIG. 1 the input voltage to be integrated $u_e$ is applied to terminals 10, 11. The capacitor 12 to be charged has the capacity C. It shall be charged via a charging resistor 13 of value R. The voltage $u_a$ across capacitor 12 is applied to the input of a valve amplifier 14, connected as cathode amplifier, with a triode 15 being supplied by an anode voltage source 16, and in the cathode circuit of which the emitter base connection of a transistor 17 is in series connection with the cathode resistor 18. The transistor 17 operates in base connection and contains the base collector circuit thereof a power source 19 and an adjustable resistor 20. The adjustable resistor 20 is in series connection with the cathode resistor 18 in the charging circuit of capacitor 12, which extends from terminal 10 via charging resistor 13, capacitor 12, cathode resistor 18 and the adjustable positive feedback resistor 20 to terminal 11.

A voltage is impressed across the cathode resistor 18, which is approximately equal to the capacitor voltage $u_a$; however, it does not quite reach the same. The cathode current of valve 15, however, also flows via the emitter base connection of transistor 17 and is effective to cause—with a gain of not quite one—an almost equally great flow of current in resistor 20. Thus, a voltage is impressed across resistor 20, which is constantly proportional to the voltage $u_{18}$ across cathode resistor 18 and adjustment of resistor 20 is effective to cause the total voltage $u_r$ developed across resistors 18 and 20 to be always just oppositely equal to the capacitor voltage $u_a$. Thus, the transistor 17 with resistor 20 supplies the voltage required to obtain an effective gain of one. The positive feedback voltage $u_r$ is effective to insure (in a manner known as such) that there is no capacitor voltage $u_a$ existing as counter voltage for the input voltage $u_e$ to be integrated, which may rather feed the charging current $i$ always into an apparently uncharged capacitor. It may also be stated that the input voltage is always increased by the amount of the capacitor voltage via the amplifier.

With the arrangement according to FIG. 1, the positive feedback voltage is still mostly taken off across the cathode resistor 18 of the amplifier 14, as is the case with the known arrangement. Resistor 20 with transistor 17 is only required to supply a correction so as to attain the gain of one. With the circuitry according to the invention, however, the cathode resistor of the amplifier may also be connected to be arranged completely outside the capacitor-charging circuit. Such an arrangement is shown in FIG. 2.

Figure 2:
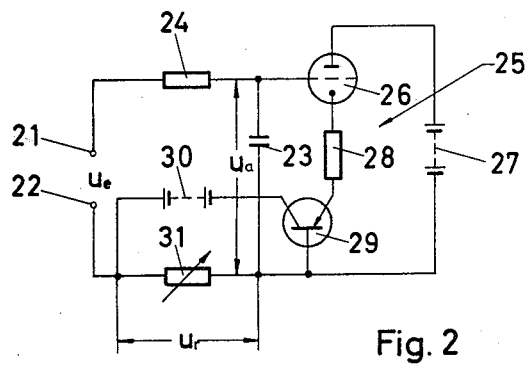
FIG. 2 illustrates a modification of the arrangement according to FIG. 1 wherein the cathode resistor of the amplifier valve is connected to be completely outside of the charging circuit of the capacitor and only a positive feedback resistor is connected on the one hand into the charging circuit of the capacitor and on the other hand also into the collector circuit of the transistor.

In FIG. 2 an input voltage $u_e$ to be integrated is applied to terminals 21 and 22. A capacitor 23 is charged via a charging resistor 24. The voltage $u_a$ across capacitor 23 is applied to the input of a cathode amplifier 25 with a triode 26 being supplied by an anode voltage source 27. The cathode circuit of valve 26 has also connected therein a cathode resistor 28 and the emitter base connection of a transistor 29 in a sequence, however, reversed with respect to FIG. 1. The collector base circuit of transistor 29 has connected therein a power source 30 and an adjusting resistor 31. The adjusting resistor 31 is connected into the charging circuit of capacitor 23 which extends from terminal 21 via charging resistor 24, capacitor 23 and adjusting resistor 31 to terminal 22. It can be seen that in this case the cathode resistor 28 of amplifier 25 is not connected into this charging circuit. Transistor 29, operating in base connection, generates a current in circuit 30, 31 which—with the current amplification ≈1—is substantially equal to the cathode current. Resistor 31 is somewhat larger than resistor 28 and is adjusted so that the voltage drop $u_r$ thereacross is always exactly equal to the voltage $u_a$ applied to capacitor 23. Then, a voltage $u_e + u_r$ is always applied to the RC-member comprised of resistor 24 and capacitor 23.

The circuitries according to FIGS. 1 and 2 suffer from the drawback that with $u_a = 0$ there is a cathode current flowing and a compensating voltage is developed across the resistor 20 in FIGURE 1 or the resistor 31 in FIGURE 2 and the input terminal 11 is placed at a positive potential relative to the input terminal 10.

With the arrangement according to FIG. 3 a differential amplifier 32 with two triodes 33 and 34 is used. The triodes are connected to an anode voltage source 35. The cathodes of valves 33 and 34 are connected with each other in the usual manner via cathode resistors 36 and 37. An input voltage $u_e$ to be integrated is applied to terminals 38 and 39. The capacitor to be charged is indicated by reference numeral 40, and the charging resistor is indicated by reference numeral 41. The charging circuit extends from terminal 38 via resistor 41, capacitor 40 and an adjustable resistor 42 to terminal 39. The voltage $u_a$ across capacitor 40 is applied to the input of the amplifier section provided by valve 33. The grid of valve 34 is connected via a lead 43 with the junction of cathode resistors 36, 37 and of capacitor 40, respectively. The input of the amplifier section provided by valve 34 is therefore practically constantly short-circuited.

If the capacitor voltage is $u_a = 0$, then the same conditions are existing in both systems, namely, a grid potential zero and equal currents in the cathode resistors. There is no current flowing via the emitter base connection of transistor 44 symmetrically connected between cathodes of valves 33 and 34.

If, however, capacitor 40 is being charged and valve 33 is being controlled with a voltage $u_a$, then an asymmetry is produced. There is a differential current flowing via the emitter base connection of transistor 44 and a power source 45 feeds a corresponding current via the base collector connection of transistor 45 and the adjustable resistor 42. Resistor 42 is now adjusted similarly to FIG. 2 in such a manner that a voltage $u_r$ is impressed thereacross which is constantly equal to $u_a$ with respect to the amount thereof. Then, here too, charging of capacitor 40 is effected via resistor 41 with a voltage $u_e + u_r = u_e + u_a$, so that the charging current $$i = \frac{u_e + u_a - u_a}{R} = \frac{u}{R}$$

is maintained and $$u_a = \frac{1}{C}\int i\,dt = \frac{1}{RC}\int u_e\,dt$$

The arrangement according to FIG. 3 is advantageous inasmuch as with $u_a = 0$, the controlling current of transistor 44 disappears automatically. Besides, there results a substantial independence of anode voltage variations in a manner known as such.

With the arrangement according to FIG. 4, differential amplifier 46 with two triodes 47 and 48 is used as in FIG. 3. The cathodes of triodes 47 and 48 are connected with each other via cathode resistors 49, 50 of which the one (50) is adjustable for adjusting purposes. Triodes 47, 48 are supplied by an anode voltage source 51.

In contrast to the arrangement according to FIG. 3, both triodes 47 and 48 are controlled here, triode 47 (corresponding to 33) by the capacitor voltage $u_a$, the other triode 48 by the positive feedback voltage $u_r$. Normally, both these voltages are equal.

The charging circuit for the integrating capacitor 52 extends from the positive or the negative input terminals 53 and 54, respectively, a switch 55 having the contact arm thereof selectively applied to the positive or negative terminal, whereas in the center position thereof none of the input terminals is contacted, via charging resistor 56, capacitor 52, an adjustable resistor 57 to the slider of a potentiometer 58 being connected between the input terminals 53 and 54.

Between the cathodes of valves 47 and 48 there is connected, as in FIG. 3, the emitter base connection of a transistor 59.

If a capacitor voltage $u_a$ is produced, then differential current flows via the emitter base connection of transistor 59 and transistor 59 feeds a corresponding current via the base collector connection, an adjustable resistor 60 and the adjustable resistor 57. Resistor 57 is adjusted in such a manner that the voltage drop $u_r$ thereacross is always equal to $u_a$ as long as the arrangement operates in the normal range thereof. Thus, here too, the counter voltage $u_a$ is compensated by an increase of the charging voltage by the same amount when the capacitor 52 is being charged.

The grid of valve 48 is applied here between resistors 57 and 60 so that the valve is controlled with the voltage $u_r = u_a$. This is advantageous insofar as the nonlinearities of both valves substantially compensate. To have a voltage difference still existing here between the cathodes of valves 47 and 48 with the control thereof, which results in a controlling current via the emitter base connection of transistor 59, there must exist a minor difference between resistors 49 and 50. This may be adjusted by adjustability of resistor 50.

This difference between 49 and 50 results in a small differential current flowing with $u_a = 0$. This, again, is effective to cause a small voltage across $u_r$ which may, however, be compensated by adjustment at potentiometer 58.

The grids of valves 47 and 48 have connected therebetween two diodes 61 and 62 connected to be in non-parallel or oppositely poled relation. These diodes are normally blocked as $u_a = u_r$ and the grids are on the same potential so that the voltage across the diodes is zero. Now, switch 55 may also be connected to the negative input terminal 54 which is negative with respect to the slider of potentiometer 58. Then, capacitor 52 would discharge and eventually charge with reversed polarity. To avoid such an operation, diode 61 is provided. The voltage $u_r$ cannot reverse in sign as the current from transistor 59 may only be fed in one direction through resistor 57. Consequently, the grid of valve 48 cannot become negative and cannot follow the voltage of the grid of valve 47. If the capacitor voltage $u_a$ becomes negative, diode 61 unblocks and the charging current flows off via diode 61. A further negative charging of capacitor 52 is thereby prevented.

It is also desirable to have the positive charging voltage of the capacitor limited in charging position of switch 55, i.e., if the contact arm thereof is connected with the positive terminal 53. To this end diode 62 with the adjustable resistor 60 is provided. Across this resistor 60 a voltage drop exists just as across resistor 57. If the limit voltage adjustable at resistor 60 is obtained, then the voltage drop across resistor 60 is just as great as the voltage between cathode and grid of valve 48. Thus, transistor 59 does not receive any more collector base voltage and the collector current thereof cannot increase further. Thus, with further increase of the capacitor voltage $u_a$ the grid of valve 47 becomes positive with respect to that of valve 48, as the grid potential of the latter valve is no longer able to follow that of valve 17. The result is that diode 62 unblocks and prevents further positive charging of capacitor 52.

The output cathode curernts are conveniently utilized. To this end a load resistor 63 may be connected into the common lead to the voltage source 51, both cathode currents flowing therethrough. If the current in the load resistor is to be zero, with $u_a=0$, then a constant counter current must be applied. It has been found that with the circuitry as herein described integrators for running periods up to one hour with good linearity may be designed.

Through adjustment of potentiometer 58 the ratio of charging and discharging period may be adjusted which is of interest, for example, when using the integrator in connection with a two-point control.

We claim:

1. In a bootstrap-integrator circuit, first and second input terminals, a capacitor having first and second terminals, charging resistance means coupling said first terminal of said capacitor to said first input terminal, high input impedance follower amplifier means coupled to said capacitor for developing an output current proportional to voltage across said capacitor, and compensating amplifier means responsive to changes in said output current for applying between said second terminal of said capacitor and said second input terminal a voltage substantially equal and opposite to the voltage across said capacitor.

2. In a bootstrap-integrator circuit as defined in claim 1, said follower amplifier means including a load resistor having one terminal connected to said second terminal of said capacitor, and said compensating amplifier means including load resistor connected between said second input terminal and the other terminal of said load resistor of said follower amplifier means.

3. In a bootstrap-integrator circuit, first and second input terminals, a capacitor having first and second terminals, charging resistance means coupling said first terminal of said capacitor to said first input terminal, high input impedance follower amplifier means coupled to said capacitor for developing an output current proportional to voltage across said capacitor, and compensating amplifier means responsive to changes in said output current and including a load resistor connected directly between said second terminal of said capacitor and said second input terminal for applying a voltage substantially equal and opposite to the voltage across said capacitor.

4. In a bootstrap-integrator circuit as defined in claim 3, said compensating amplifier means comprising an amplifier device having one electrode connected to said second terminal of said capacitor and another electrode connected to said follower amplifier means for flow of said output current between said electrodes.

5. In a bootstrap-integrator circuit, first and second input terminals, a capacitor having first and second terminals, charging resistance means coupling said first terminal of said capacitor to said first input terminal, high input impedance follower amplifier means coupled to said capacitor for developing an output current proportional to voltage across said capacitor, and means including a transistor having a base-emitter circuit responsive to changes in said output current and a resistor in a collector circuit of said transistor coupled between said second terminal of said capacitor and said second input terminal for applying a voltage substantially equal to the voltage across said capacitor.

6. In a bootstrap-integrator circuit, first and second input terminals, a capacitor having first and second terminals, charging resistance means coupling said first terminal of said capacitor to said first input terminal, high input impedance follower amplifier means coupled to said capacitor for developing an output current proportional to voltage across said capacitor, and compensating amplifier means responsive to changes in said output current for applying between said second terminal of said capacitor and said second input terminal a voltage substantially equal to the voltage across said capacitor and of opposite polarity, said follower amplifier comprising a vacuum tube including an anode, a cathode and a control grid, said grid being connected to said first terminal of said capacitor, and a cathode resistor coupled between said cathode and said second terminal of said capacitor.

7. In a bootstrap-integrator circuit, first and second input terminals, a capacitor having first and second terminals, charging resistance means coupling said first terminal of said capacitor to said first input terminal, first follower amplifier means coupled to said capacitor for developing an output current proportional to voltage across said capacitor, second follower amplifier means connected in balanced relation with respect to said first follower amplifier means to define therewith a differential amplifier, and means responsive to a differential in current flow of said first and second follower amplifiers for applying between said second terminal of said capacitor and said second input terminal a voltage substantially equal to the voltage across said capacitor.

8. In a bootstrap-integrator circuit as defined in claim 7, said second follower amplifier including an amplifier device having a control electrode connected directly to said second terminal of said capacitor.

9. In a bootstrap-integrator circuit as defined in claim 8, said second follower amplifier means including an amplifier device having a control electrode connected to said second input terminal.

10. In a bootstrap-integrator circuit, first and second input terminals, a capacitor having first and second terminals, charging resistance means coupling said first terminal of said capacitor to said first input terminal, first follower amplifier means coupled to said capacitor for developing an output current proportional to voltage across said capacitor, second follower amplifier means connected in balanced relation with respect to said first follower amplifier means to define therewith a differential amplifier, said follower amplifier means comprising a pair of amplifier devices having output electrodes and load resistors connected between said output electrodes and said second terminal of said capacitor, and a compensating amplifier comprising a transistor having a collector and having base and emitter electrodes coupled between said output electrodes of said amplifier device, and resistor means coupled to said collector and connected to apply between said second terminal of said capacitor and said second input terminal a voltage substantially equal to the voltage across said capacitor.

11. In a bootstrap-integrator circuit, first and second input terminals, a capacitor having first and second terminals, charging resistance means coupling said first terminal of said capacitor to said first input terminal, high input impedance follower amplifier means coupled to said capacitor for developing an output current proportional to voltage across said capacitor, compensating amplifier means responsive to changes in said output current for applying between said second terminal of said capacitor and said second input terminal a voltage substantially equal and opposite to the voltage across said capacitor, and reversing switch means for connecting an input voltage source to said input terminals with a selected polarity.

12. In a bootstrap-integrator circuit, first and second input terminals, a capacitor having first and second terminals, charging resistance means coupling said first terminal of said capacitor to said first input terminal, high input impedance follower amplifier means coupled to said capacitor for developing an output current proportional to voltage across said capacitor, compensating amplifier means responsive to changes in said output current for applying between said second terminal of said capacitor and said second input terminal a voltage substantially equal to the voltage across said capacitor, and means for connecting an input voltage source to said input terminals including a voltage divider having an adjustable tap connected to said second input terminal.

13. In a bootstrap-integrator circuit, first and second input terminals, a capacitor having first and second terminals, charging resistance means coupling said first terminal of said capacitor to said first input terminal, high input impedance follower amplifier means coupled to said capacitor for developing an output current proportional to voltage across said capacitor compensating amplifier means responsive to changes in said output current for applying between said second terminal of said capacitor and said second input terminal a voltage substantially equal to the voltage across said capacitor, and a pair of oppositely poled diodes connected between said first terminal of said capacitor and said second input terminal.

References Cited by the Examiner

UNITED STATES PATENTS 2,743,357  4/1952  Casey _____ 328—182
2,983,831  2/1957  Walton _____ 328—182 X

OTHER REFERENCES

Creed: Hybrid Bootstrap Circuits Increase Sweep Linearity, Electronics, Aug. 4, 1961, 3 pages.

ARTHUR GAUSS, *Primary Examiner.*

UNITED STATES PATENT OFFICE
CERTIFICATE OF CORRECTION

Patent No. 3,219,937                                  November 23, 1965

Franz Raufenbarth et al.

It is hereby certified that error appears in the above numbered patent requiring correction and that the said Letters Patent should read as corrected below.

Column 5, lines 53 to 55, the equation should appear as shown below instead of as in the patent:

$$i = \frac{u_e + u_a - u_a}{R} = \frac{u_e}{R}$$

column 6, line 70, for "17" read -- 47 --.

Signed and sealed this 6th day of December 1966.

(SEAL)
Attest:

ERNEST W. SWIDER                          EDWARD J. BRENNER
Attesting Officer                              Commissioner of Patents